Dec. 9, 1969    R. J. GOETCHIUS ET AL    3,482,441
AUTOMATIC TRANSMISSION SHIFT TIMING METHOD AND DEVICE
Filed Aug. 9, 1968    3 Sheets-Sheet 1

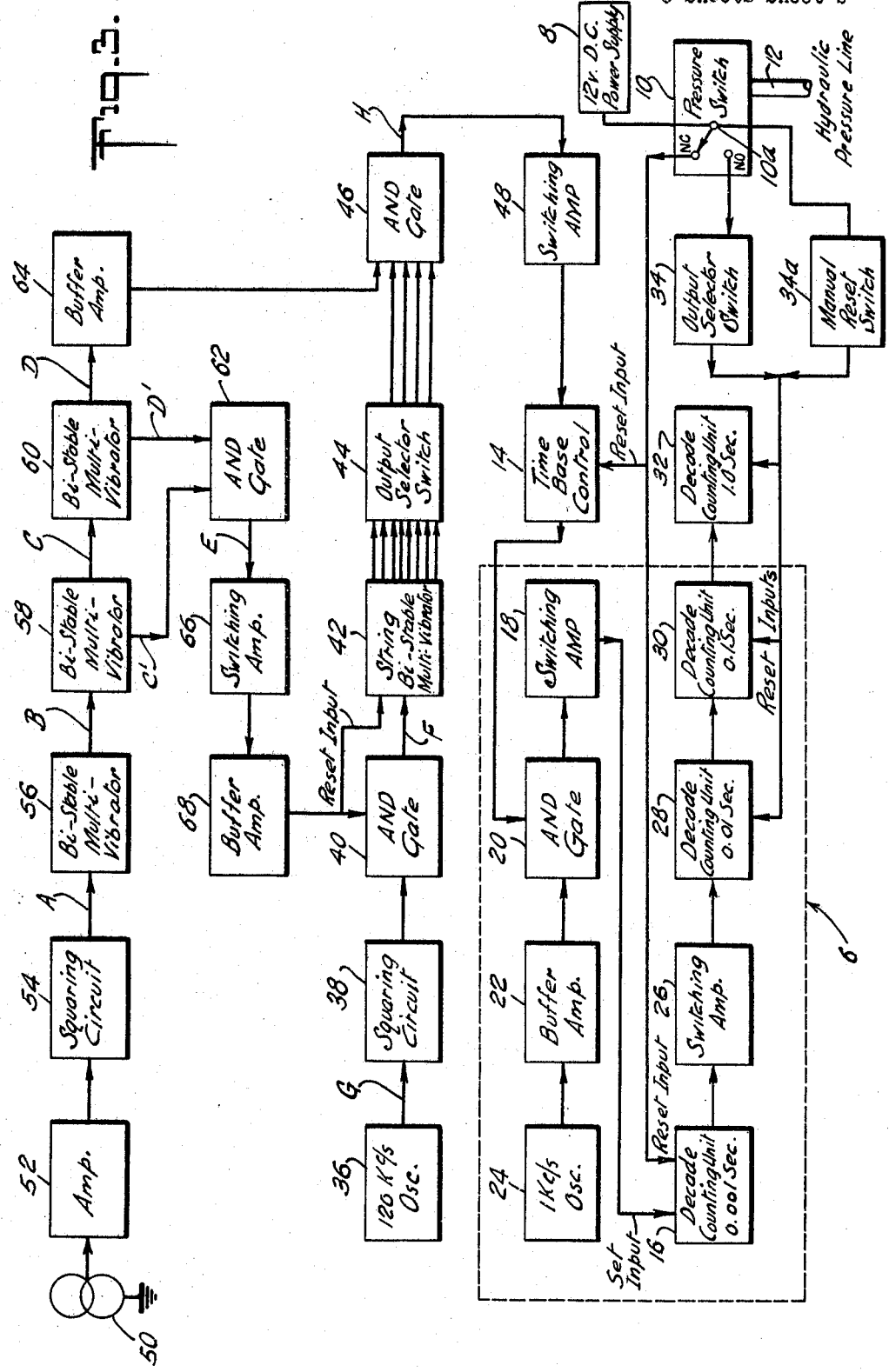

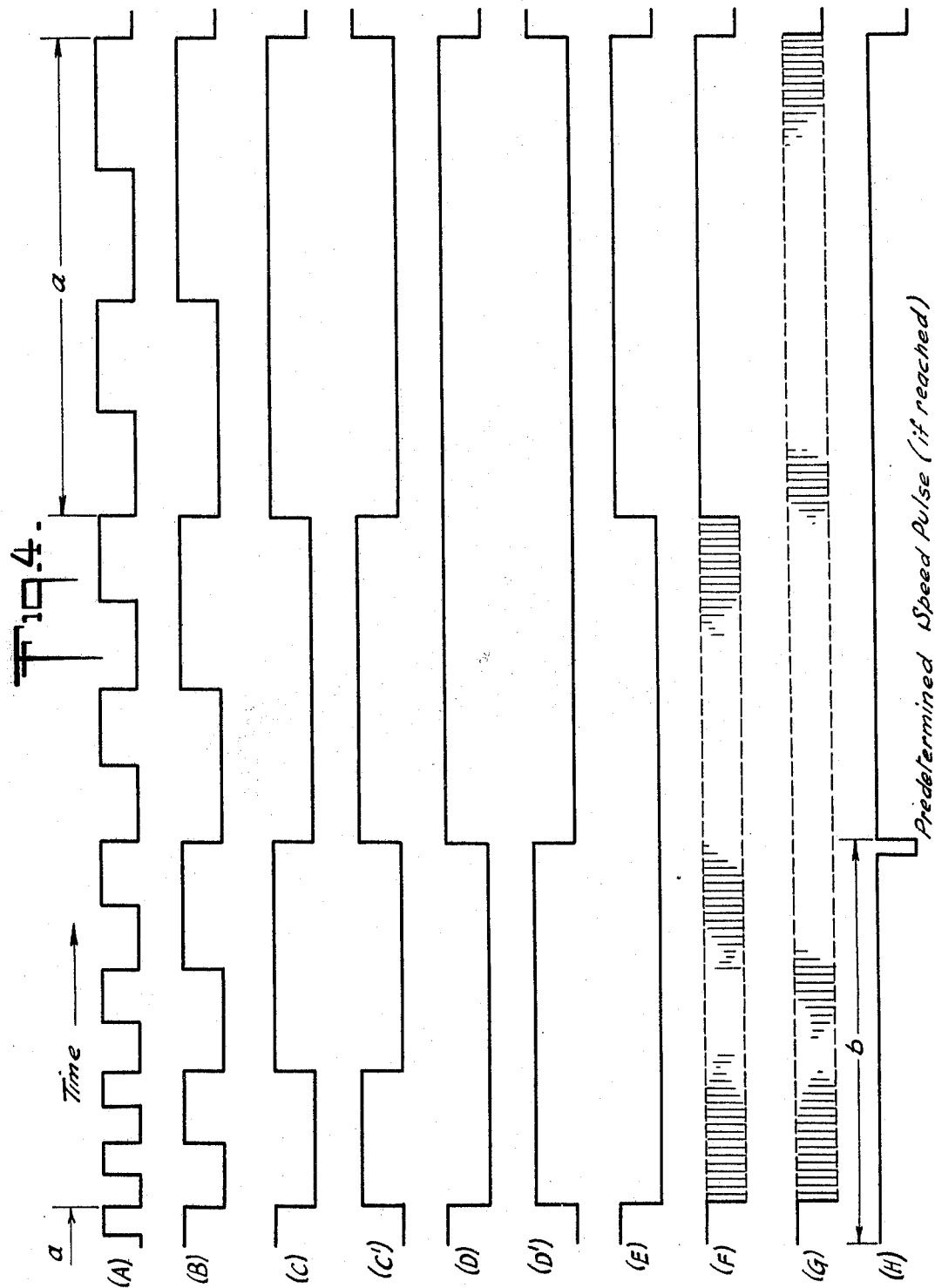

United States Patent Office 3,482,441
Patented Dec. 9, 1969

3,482,441
AUTOMATIC TRANSMISSION SHIFT TIMING
METHOD AND DEVICE
Ronald J. Goetchius and Jerry L. Nolting, Fishkill, N.Y.,
assignors to Texaco Inc., New York, N.Y., a corporation of Delaware
Filed Aug. 9, 1968, Ser. No. 751,448
Int. Cl. G01m 13/02; G04b 5/20
U.S. Cl. 73—118                          12 Claims

ABSTRACT OF THE DISCLOSURE

An apparatus for use in conjunction with a power drive train for measuring the time interval during which an automatic transmission up-shifts from one gear ratio to the next higher gear ratio. The time interval is measured from the time the hydraulic pressure in the clutch apply pressure line reaches a predetermined level to the time the engine speed reaches a predetermined rotational speed. A pressure sensitive switch in the clutch apply pressure line is operative at the predetermined level of pressure to reset and initiate operation of a counter receiving timing pulses of a predetermined substantially constant frequency. Upon the engine reaching the predetermined rotational speed, a signal is generated which inhibits a gate in a circuit path coupling the source of predetermined substantially constant frequency pulses to the counter. The sum of the pulses received by the counter are recorded in a register.

BACKGROUND OF THE INVENTION

This invention pertains, in general, to an automatic means for measuring a selected time interval during which an automatic transmission up-shifts from one gear ratio to the next higher gear ratio.

A most useful instrument for measuring dynamic data simultaneously has been the multi-channel direct recording oscillograph which produces permanent records of dynamic forces. Briefly, a direct recording oscillograph includes a light source, a mirror galvanometer, an optical system, a recording device and a system for transporting the record of the displayed signal or signals. A transducer converts each variable into a signal voltage which is electrically introduced into a separate channel of the oscillograph. The output of each channel is a pencil beam of ultra-violet light which is displayed onto a recording medium comprising sensitized paper carried by the transport system of the instrument. The mirror galvanometer varies the light reflected from the source through the optical system along a coordinate path relative to the value of the voltage signal input to the channel.

Recently, the multi-channel direct recording oscillograph has been used to measure the time interval required by an automatic transmission to shift from low to high range. This time interval is significant in that variations in shift times are indicative of transmission fluid change or breakdown, transmission wear, and variations in test conditions. The time intervals have been determined from displays recording the parameters of engine speed and clutch pressure as a function of time during which shifting of the automatic transmission takes place. A skilled technician is then required to plot points indicative of the beginning and end of the time interval (respectively points 1 and 2 of FIG. 1, prior art) during which the automatic transmission has shifted. Point 1 is the juncture of extrapolated linear portions of the horizontal and rising clutch pressure characteristic. Point 2 is the juncture of extrapolated linear portions of the engine speed curve, where they cross as shown. By construction, the time interval $t1$ between points 1 and 2 is determined from the time axis.

This arrangement, however, is time consuming when used on a routine basis and requires the presence of an operator to monitor the test. In addition, the multi-channel direct recording oscillograph cannot be made to shut down the apparatus being monitored should the apparatus operate outside preselected limits of safe operation.

SUMMARY OF THE INVENTION

The present invention overcomes the disadvantages of the prior art by providing an automated apparatus for measuring and recording the time interval during which an automatic transmission up-shifts from one gear ratio to another.

An advantage of the present invention is that the accuracy of obtained data is improved by eliminating operator error.

Another advantage of the present invention is that the collection of data is uninterrupted when used in conjunction with a storage unit.

A further advantage of the present invention is that the accumulated data is recorded directly in engineering units which saves many hours of conversion time.

A specific advantage is the capability of the present apparatus to provide means for automatic shut-down of the test equipment concerned should the variables being monitored exceed predetermined limits. Such automatic shut-down may be incorporated with an alarm system. This protects costly equipment such as the engine and transmission and avoids rerun time.

An object of the present invention is to eliminate operator error;

A further object of the invention is a system which can collect data uninterruptedly;

Another object of the invention is to provide a system which can directly collect data in engineering units; and An additional object of the invention is to provide a system which, in addition to collecting data, is capable of automatically shutting down the equipment being monitored should the incoming parameters vary outside a preselected safe band, to prevent equipment failure.

Briefly stated the present invention provides an improved apparatus for measuring the time interval during which an automatic transmission associated with an engine and including a clutch, up-shifts from one gear ratio to another. The time interval is measured between two points, the first point being manifested in a predetermined change in a first physical condition related to transmission performance and the second point being manifested in a predetermined change in a second physical condition which is also related to transmission performance. The apparatus comprises means for generating a first signal indicative of the condition of rotational speed of the engine, and means for developing a signal indicative of the time interval between the occurrence of the first and second signals mentioned above.

BRIEF DESCRIPTION OF THE DRAWING

The advantages and objects of this invention and mode of operation thereof may be better understood and appreciated by reference to the following description of the invention taken in conjunction with the accompanying drawings wherein:

FIG. 3 is a block diagram of a preferred embodiment of apparatus for measuring the shifting time of an automatic transmission according to the present invention; and FIG. 4 is a diagram illustrating timing signal waveforms present at various points in the apparatus shown in the block diagram comprising FIG. 3.

THE PRIOR ART

Figure 1:
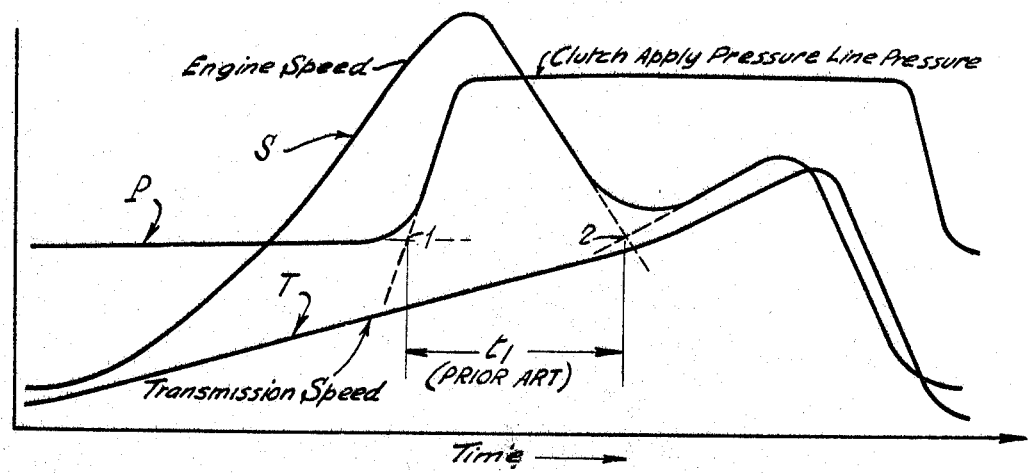
FIG. 1 is a strip chart display as used in the prior art to determine shift timing.

In accordance with the prior art, the transmission shifting time interval $t_1$, as shown in FIG. 1 of the drawings, has been measured from a first point 1 to a second point 2, where the points 1 and 2 have been extrapolated from information recorded on a strip chart display of engine speed S, clutch apply pressure line pressure P, and transmission speed T, all as shown in FIG. 1.

DESCRIPTION OF THE PREFERRED EMBODIMENT

Figure 2:
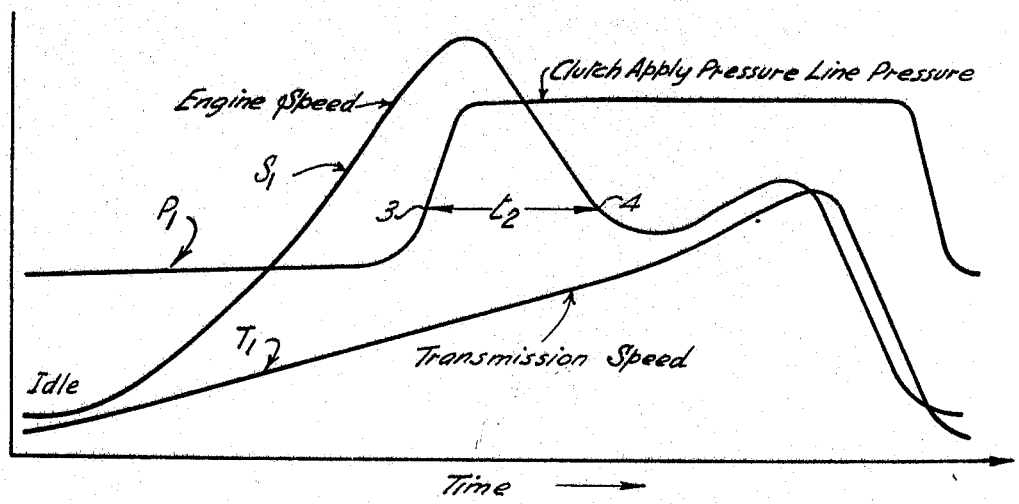
FIG. 2 is a strip chart display indicating the measurement performed by the present invention.

In accordance with the present invention, as illustrated in FIG. 2, transmission shifting time interval $t_2$ is measured and displayed from a first signal indicative of a predetermined condition of clutch engagement at a point 3 on the rising portion of the line representing the clutch apply pressure line pressure characteristic $P_1$, e.g., the pressure in the hydraulic line controlling the condition of clutch engagement, to a second signal indicative of a predetermined rotational speed of the engine at a point 4 on the bottom of a first descending portion of the line representing the engine speed characteristic $S_1$. This is accomplished by developing a third signal having a characteristic which is proportional to the time interval between the occurrences of the first and second signals which is indicative of the transmission shifting time interval $t_2$. Since points 3 and 4 are selectively taken on, or close to, the same straight portions of the lines $P_1$ and $S_1$, respectively, from which points 1 and 2 would be taken, the time intervals $t_2$ and $t_1$ are proportional to one another. For completeness, the line representing the transmission speed characteristic $T_1$ has also been shown in FIG. 2.

The elements of the apparatus shown within the dashed-line box 6 in FIG. 3 comprise a time base generator and associated display circuitry which are part of the block diagram to be described in detail below and are provided for developing a signal corresponding to the time interval between points 3 and 4. A 12 volt, direct current power supply 8 is shown connected to the pivot contact 10a of a pressure actuated single-pole double-throw switch 10, the latter being shown mounted in the clutch apply pressure line 12 e.g., mounted so that its pressure sensitive element (not shown) is responsive to the pressure in the hydraulic line controlling the condition of clutch engagement, and having a normally closed contact position NC and a normally open contact position NO. The pressure actuated switch 10 in the normally closed position connects the 12 volt direct current power supply 8 to the reset input of a time base control 14 which is, for example, a bi-stable multivibrator well known in the art, having a set input, a reset input and an output. In the normally closed position, the pressure actuated switch 10 also connects the 12 volt direct current power supply to the input of a first decade counting unit 16.

The first decade counting unit 16 comprises apparatus capable of storing or registering signal information representing a decimal count of the number of pulses received at a set input thereof and which is capable of producing a signal indicative thereof at its output. The counting unit 16 is capable of being disabled or blocked to prevent the accumulation of such signal information representing counts by applying a suitable reset signal, for instance, a 12 volt direct current voltage at its reset input. An example of the first decade counting unit is the commerically available solid state decade counting module sold by Anadex Instruments Inc. and advertised on their Data Sheet 1662–1 printed on May 1962. The set input of the first decade counting unit 16 is connected to the output of a first switching amplifier 18, which is a threshold device operated at cutoff so that signals below the threshold level generated by noise in the circuit, are not transmitted therethrough. The input of the first switching amplifier 18 is connected to the output of a first AND gate 20 which is a standard AND gate with two inputs and an output and is well known in the art. The first AND gate 20 has a first or enabling input connected to the output of time base control 14 and a second input which is connected to the output of a first buffer amplifier 22 which is an impedance matching circuit for isolating the driving and driven circuits from one another. The first buffer amplifier 22 has its input connected to the output of a source of constant frequency pulses 24 such as a standard one kilocycle per second tuning fork oscillator thus preventing the latter from being influenced by the first AND gate 20 impedance. The first AND gate only passes pulses from the source of constant frequency pulses 24 when enabled by time base control 14.

The pressure actuated single-pole double-throw switch 10 is responsive to a predetermined change in a first physical condition related to performance of the transmission (not shown) i.e. attainment of a predetermined level of hydraulic pressure in the clutch-apply pressure line 12 (point 3.) When the hydraulic pressure in the clutch-apply pressure line 12 is below the predetermined level, for example, below 35 p.s.i.a., the pressure actuated switch 10 is in the normally closed NC position, thereby connecting the 12 volt direct current power supply to the rest inputs of the time base control 14 and the first decade counting unit 16.

When the time base control 14 has the 12 volt direct current signal impressed on its reset input, the first AND gate 20 is enabled so that pulses received at its second input, initially generated by the source of constant frequency pulses 24, are transmitted through the first switching amplifier 18 to the set input of the first decade counting unit 16.

The 12 volt direct current signal applied to the reset input of the first decade counting unit 16 prevents the accumulation of pulses thereat. The output of the first decade counting unit 16 is connected through a second switching amplifier 26 to the input of a second decade counting unit 28. The output of the second decade counting unit 28 is connected to the input of a third decade counting unit 30 and the output of the third decade counting unit is connected to the input of a fourth decade counting unit 32. The first decade counting unit 16, switching amplifier 26 and second, third and fourth decade counting units, respectively, 28, 30 and 32 are serially connected and the latter three, for example, include register means such as a Nixie indicator 8421 (B5092) as shown in Burroughs Corporation Catalogue 616B, on page 6 under the registered trademark of Nixie. Another example of a register means is a conventional data processing printer.

The second switching amplifier prevents spurious low level signals emitted by surrounding equipment from triggering inputs to the decade counting units.

The first, second, third and fourth decade counting units 16, 28, 30 and 32, respectively, accumulate pulses generated by the source of constant frequency pulses 24 and the foregoing together with the first and second switching amplifiers, 18 and 26, respectively, the first buffer amplifier 22 and the first AND gate 20 comprise the time base generator and display circuitry 6.

The time base generator and display circuitry 6 provides, for example, with one kilocycle per second pulses generated by the source of constant frequency pulses 24 and transmitted to the first decade counting units 16, a display resolution at the register means associated with the second, third and fourth decade counting units, 20, 30 and 32, respectively, of 0.01 second. It will be appreciated that the display circuitry including the second, third and fourth decade counting units 28, 30 and 32, respectively give a visual indication of the time being measured to two decimal places.

When the hydraulic pressure in the clutch apply pressure line 12 reaches the predetermined level, the pressure actuated switch is moved to the normally open position wherein the 12 volt direct current signal is removed from the first decade counting unit 16 and the reset input no longer functions to disable or block accumulation of the counts indicative of the number of pulses received at the set input. Thus each succeeding pulse received at the first decade counting unit 16 is accumulated and the overflow carried into the second, third and fourth decade counting units respectively 28, 30 and 32 for display as the circumstances require.

The first, second, third and fourth decade counting units respectively 16, 28, 30 and 32, accumulate counts until a second point 4 (FIG. 2) is reached when the rotational speed of the engine has been slowed down to a predetermined speed by the up-shift of the transmission. At this point a second signal is generated and transmitted to time base control 14 switching it to its non-enabling state thereby inhibiting the first AND gate 20 controlled thereby.

The shifting test cycle is terminated when the engine speed is reduced to idle, causing the transmission to downshift with a concomitant decrease in the hydraulic pressure in the clutch apply pressure line. This switches the pressure actuated switch 10 to its normally closed position connecting the 12 volt direct current power supply to the reset inputs of the first decade counting unit 16 and the time base control 14. The displayed reading at this point is the time interval $t_2$ for the shifting test cycle monitored which can be held in the register means after the cycle is terminated.

In a preferred embodiment, the normally open contact position NO of the pressure actuated switch 10 connects the 12 volt direct current power supply 8 to the input of a monostable multivibrator 34 having a time delay characteristic so that its output which is connected in parallel to the reset inputs of the second, third and fourth decade counting units 28, 30 and 32, respectively, prevents accumulation of counts therein for a relatively short period after switching pressure actuated switch 10, to the normally open NO position. This prevents falsely triggering the second, third and fourth decade counting units 28, 30 and 32, respectively, by noise generated during the switching of the pressure actuated switch 10.

A manual reset switch 34a, for example a double-pole single-throw, push button switch connecting the 12 volt direct current power supply 8 to each of the reset inputs of the second, third and fourth decade counting units 28, 30 and 32, respectively, can be desirably provided to hold the latter in reset whenever an operator wishes to override the system and cancel the register.

The engine rotational speed is being continuously sampled to detect the predetermined speed corresponding to point 4, in the following manner. The output of a clock pulse means such as a crystal controlled oscillator 36 which produces, for example, electrical pulses at a rate of 120 kilocycles per second at its output is connected to the input of a first squaring circuit 38. The first squaring circuit shapes the pulses rectangularly for use in the circuit and the output of the first squaring circuit 38 is connected to the first input of a second AND gate 40 which transmits the pulses therethrough only when enabled through a second or enabling input. The second AND gate 40 has an output connected to a set input of a serially connected string of bi-stable multivibrators 42. The latter preferably comprises 8 units connected for counting from 0 to 255 sequentially as the pulses arrive at the set input. The serially connected string of bi-stable multivibrators 42 also has a reset input and an output.

An output selector switch 44 having a suitable number of selectable switch positions, each corresponding to a different particular count reached in the string of bi-stable multivibrators, has its inputs connected in parallel circuit configuration to the outputs of the serially connected string of bi-stable multivibrators 42. The output of the output selector switch 44 is connected to the first input of a third AND gate 46. The third AND gate 46 has, in addition, an enabling input and an output, the latter being connected to the input of a third switching amplifier 48 which is a threshold device similar to the first and second switching amplifiers respectively 18 and 26 and prevents low level noise from passing therethrough. The output of the third switching amplifier 48 is connected to the set input of time base control 14.

The gated pulses generated by the clock pulse means 36 are transmitted to the input of the serially connected string of bi-stable multivibrators 42 for counting and the number accumulated in the serially connected string of bi-stable multivibrators 42 is indicative of the time transpired during which a selected premeasured portion of an engine cycle runs. As the engine slows down the count increases each time because of the longer period taken for the selected premeasured portion of a cycle to run and thus continually approaches the count preselected which is indicative of the predetermined speed. When the count is at least equivalent to that preselected, i.e. the engine has slowed down to the predetermined speed, the time base control 14 is actuated to its normally non-enabling state thereby inhibiting AND gate 16. The oscillator output pulses flow sequentially through the first squaring circuit 38 which can be, for example a Schmitt trigger (i.e., a cathode-coupled binary circuit as described in Pulse and Digital Circuits by Millman and Taub, published by McGraw-Hill Book Company, Inc., copyright 1956, on pages 164 through 168) to form a rectangular pulse.

The second AND gate 40 is alternately opened and closed by a signal proportional to the selected portion of the engine cycle being measured and will be described in detail below. The number of constant frequency pulses gated into the serially connected string of bi-stable multivibrators during this cycle is an inverse measure of the rotational speed of the engine. Such a signal can be generated by known means, for example, by a magnetic pick-up 50 which is disposed in the vicinity of a disc having a plurality of peripheral teeth thereon such as a 60-tooth disc, attached to an appropriate rotating member of the engine, such as, the vibration damper (disc and engine vibration damper are not shown) rotating at engine speed so that it will be excited as the peripheral teeth pass by. The output of the magnetic pick-up 50 is connected to the input of an amplifier 52 to increase the level of the weak magnetic signal. The output of the amplifier 52 is connected to a second squaring circuit 54 such as a Schmitt trigger, having an input and an output to shape the signal into a rectangular pulse. The output of the second squaring circuit 54 (waveform A of FIG. 4) is connected to the input of a first bi-stable multivibrator 56 having a "one" logic output (waveform B) connected to the input of a second bi-stable multivibrator 58. The second bi-stable multivibrator 58 has a "one" logic output (waveform C) connected to the input of a third bi-stable multivibrator 60 and a "zero" logic output (waveform C') connected to the input of a fourth AND gate 62. The third bi-stable multivibrator 60 also has a "zero" logic output (wavefore D') connected to a second input of the fourth AND gate 62 and a "one" logic output (waveform D) connected to the input of a second buffer amplifier 64. The output of the second buffer amplifier 64 is connected to a second input of the third AND gate 46. The serially connected first, second and third bi-stable multivibrators, 56, 58 and 60, respectively, are connected for binary division to form an 8 bit word from the pulses generated by the magnetic pick-up 50. The time measurement isolated by the 8 bit word is the time transpired for 8/60 (with a 60-tooth disc) of the disc to rotate by the magnetic pick-up 50.

The output (waveform E) of the fourth AND gate 62 is connected to the input of a third switching amplifier 66, which is a threshold device preventing the passage of low level noise therethrough. The output of the third switching amplifier 66 is connected to the input of a third buffer amplifier 68 which isolates any reaction from the third switching amplifier 66 on the second enabling input of the second AND gate 40 and the reset input of the serially connected string of bi-stable multivibrators 42 to which the output of the third buffer amplifier 68 is connected in parallel.

As can be seen the frequency of the pulses generated by magnetic pick-up 50 and the sampling time period are related to the engine rotational speed.

The "zero" logic output of the second and third bistable multivibrators respectively 56 and 58, having waveforms C' and D', are the two inputs to the fourth AND gate 62 and coincident conduction occurs thereat during period a only. The fourth AND gate 62, during coincident conduction of its inputs, has a first level signal and is open during period a.

The second AND gate 40 is enabled during corresponding periods when the fourth AND gate 62 is enabled (see waveshape F taken at the output of the second AND gate) and clock pulses (waveform G) from the crystal controlled oscillator 36 are transmitted to the string of bistable multivibrators during this period for counting. The third AND gate 46 is only enabled until the end of period b, when the voltage level of the "one" logic output of the third bi-stable multivibrator 60 (waveform D) transmitted through the second buffer amplifier 64, is switched to the inhibiting level. When the third AND gate 46 (having output waveform H) is inhibited, any further pulses received at the string of bi-stable multivibrators 42 will not effect an output through output selector switch 44. This prevents an erroneous pulse being transmitted through the third AND gate 46 by the noise of resetting when the second level signal from the output of the third buffer amplifier 68 resets the string of bi-stable multivibrators 42 during period a to a zero count for the next cycle.

In operation, the frequency of the pulses generated by magnetic pick-up 50 are directly proportional to the rotational speed of the engine. Consequently, for the first four pulses at the beginning of each sampling period (period b) the second and third AND gates 40 and 46, respectively, are simultaneously enabled, and the clock pulses generated by crystal controlled oscillator 36 are counted in the string of bi-stable multivibrators 42. If the count in the string of bi-stable multivibrators 42 reaches the preselected count (i.e. a switch position or value selected for that particular count in the output selector switch 44) a pulse is transmitted from the string of bi-stable multivibrators 42 to the third AND gate 46 which steers a pulse through the third switching amplifier 48 to time base control 14.

When the time base control 14 is energized by an output from the third AND gate 46 through third switching amplifier 48, the first AND gate 20 is closed and no further pulses from the source of constant frequency pulses 24 are passed therethrough.

The count accumulated in the second, third and fourth decade counting units 28, 30 and 32, respectively, and displayed is the value of the time interval for the automatic transmission shift monitored. This value can be recorded and the whole process repeated for the next transmission test cycle.

In a typical embodiment of the invention, the normal shifting period is about 0.5 second. When the time for shifting reaches one second, this is an indication that either the transmission itself or the fluid therein is becoming faulty. The engine can be automatically shut down if this occurs, by having a relay (not shown) connected in known manner to the output of the bi-stable multivibrator in the fourth decade counting unit 32. This relay will be energized for instance when the one second count is reached, to open a normally closed switch connected in the primary of the ignition (not shown) in known manner and thereby disrupt engine operation.

To prevent spurious signals being emitted by surrounding equipment from falsely triggering a circuit, as explained above first, second, third and fourth switching amplifiers have been used in the present invention. These switching amplifiers are threshold devices operated at cut-off and the pulses in the system are maintained sufficiently large so that they exceed the threshold level and are passed through the switching amplifier without concomitant low level noise.

Although not described, it is to be understood that this invention encompasses other physical variables for measuring the time interval for the automatic transmission shift, including pressure sensing devices for generating a first signal where the transmission varies the pitch of the blades instead of using a hydraulic clutch line and gears.

It is also to be understood that this invention encompasses analogue as well as digital means to measure the first and second physical variables and the time base generator and display circuitry.

Since many changes could be made in the above-described constructions and many apparently widely different embodiments of this invention could be made without departing from the scope thereof. it is intended that all matter contained in the above description or shown in the accompanying drawings shall be interpreted as illustrative and not in a limiting sense.

We claim:
1. An improved measuring apparatus for measuring the time interval during which an automatic transmission shifts from one gear ratio to another gear ratio, said apparatus being for use in conjunction with a power drive train including an engine, automatic transmission and a load, said apparatus comprising:
   (a) first means for generating a first signal representative of a first physical variable related to the performance of said drive train, said first physical variable exhibiting a measurable change at least in part, during the inception of shifting of said transmission from a first value thereof to at least a predetermined second value thereof;
   (b) second means for generating a second signal representative of a second physical variable related to the performance of said drive train, said second physical variable exhibiting a measurable change at least in part, during the period of shifting of said transmission from a first value thereof to at least a predetermined second value thereof; and
   (c) time measuring means coupled to said first and second signal generating means and responsive to said first and second signals, said time measuring means measuring said time interval for shifting of said transmission by measuring the time interval transpiring between the occurrence of said second predetermined value of said first physical variable and the occurrence of said second predetermined value of said second physical variable, whereby said time interval is measured in accordance with said second predetermined value of said first physical variable and said second predetermined value of said second physical variable.

2. An improved measuring apparatus as defined in claim 1, wherein said first physical variable related to the performance of said drive train is the hydraulic pressure of a clutch apply pressure line.

3. An improved measuring apparatus as defined in claim 2, wherein said predetermined second value of said first physical variable is 35 p.s.i.a.

4. An improved measuring apparatus as defined in claim 2, wherein said first means comprises a pressure sensitive switch responsive to the hydraulic pressure of the clutch apply pressure line.

5. An improved measuring apparatus as defined in claim 1, wherein said second physical variable is the rotational speed of said engine.

6. An improved measuring apparatus as defined in claim 5, wherein said predetermined second value of said second physical variable is between 1800 and 3600 revolutions per minute.

7. An improved measuring apparatus as defined in claim 5, wherein said second means includes:
   (a) third means for repeatedly generating a third signal related to the performance of an appropriate rotating member of said engine and indicative of the rate of engine rotation;
   (b) clock pulse means for generating constant frequency pulses;
   (c) pulse counting means responsive to the pulses from said clock pulse means and having a reset input therein operationally coupled to said clock pulse means;
   (d) fourth means for sampling a portion of said third signal operationally coupled with said means for repeatedly generating a third signal;
   (e) fifth means operationally coupled with said fourth means and the reset of said pulse counting means, and responsive to said portion of said third signal to generate a first level signal for a proportionate part thereof and to generate a second level signal for the remainder thereof, said pulse counting means being reset during said second level signal;
   (f) first gating means operationally coupled with said clock pulse means and said pulse counting means and responsive to said fifth means, said gating means being enabled by said first level signal and inhibited by said second level signal from said fifth means to pass said pulses from said clock pulse means to said pulse counting means;
   (g) selector switch means serially coupled to said pulse counting means and having an output, said selector switch means providing a conductive electrical path from a preselected count in said pulse counting means to said selector switch means output when said preselected count is reached in said pulse counting means; and
   (h) time base control means related to said selector switch means and responsive to said selector switch means, whereby when a preselected count is reached in said pulse counting means a second signal is generated thereby.

8. An improved measuring apparatus as defined in claim 7, wherein a second gating means is operatively coupled with said selector switch means and said time base control means and is enabled by said fourth means when said first level signal is present in said apparatus so that noise generated when said pulse counting means is reset by said second level signal, does not falsely generate said second signal.

9. An improved measuring apparatus as defined in claim 1, wherein said time measuring means includes:
   (a) a source of constant frequency pulses for continuously providing pulses of a known constant frequency;
   (b) counting means including register means operatively coupled with said source of constant frequency pulses and held in reset by said first means prior to said first physical variable reaching the predetermined second value; and
   (c) third gating means responsive to said second means and serially coupled between said source of constant frequency pulses and said counting means, said third gating means being enabled by said first means while said first physical variable is at said first value and inhibited by said second means for generating a signal so that the count stored in said regitser means is indicative of said time interval.

10. A method of measuring the time interval during which an automatic transmission up-shifts from one gear ratio to another gear ratio, wherein said automatic transmission along with a load and an engine are part of a power drive train, comprising:
   (a) generating a first signal in response to a first physical variable related to the performance of said drive train exhibiting a measurable change at least in part, during the inception of shifting of said transmission from a first value thereof to at least a predetermined second value thereof;
   (b) initiating a measurement of the time interval when said first signal is generated;
   (c) generating a second signal in response to a second physical variable related to the performance of said drive train exhibiting a measurable change at least in part, during the period of shifting of said transmission from a first value thereof to at least a predetermined second value thereof; and
   (d) concluding the measurement of said time interval when said second signal is generated.

11. A method of measuring as defined in claim 10, which includes displaying the measurement of said time interval.

12. A method of measuring as defined in claim 10, where the second signal is generated by:
   (a) measuring the time period during which a portion of an engine cycle occurs;
   (b) comparing the measured time period to a standard time period representative of a predetermined engine speed; and
   (c) generating said second signal when said measured time period is equal to said standard time period.

References Cited

UNITED STATES PATENTS

| 3,302,107 | 1/1967 | Flaugher et al. | 73—118 X |
| 3,331,200 | 7/1967 | Byron et al. | |
| 3,389,600 | 6/1968 | Rau | 73—118 |

RICHARD C. QUEISSER, Primary Examiner

JERRY W. MYRACLE, Assistant Examiner

U.S. Cl. X.R.

58—145